United States Patent [19]
Papke et al.

[11] Patent Number: 6,097,496
[45] Date of Patent: *Aug. 1, 2000

[54] INTEGRATED DISPLAY LIST AND BUILDING TOOL FOR MULTIPLE PERSONALITIES

[75] Inventors: Jeff H. Papke, Meridian; Russell Campbell; Charles Keyes, both of Boise, all of Id.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,624

[22] Filed: Apr. 21, 1997

[51] Int. Cl.[7] .................................................... C06T 11/00
[52] U.S. Cl. ............................................ 358/1.1; 395/101
[58] Field of Search ..................................... 395/101, 109, 395/112, 114, 504; 358/1.1, 1.9, 1.13, 1.15

[56] References Cited

U.S. PATENT DOCUMENTS

| | | | |
|---|---|---|---|
| 5,075,874 | 12/1991 | Steeves et al. | 395/112 |
| 5,165,014 | 11/1992 | Vassar | 395/112 |
| 5,226,112 | 7/1993 | Mensing et al. | 395/114 |
| 5,293,466 | 3/1994 | Bringman | 395/114 |
| 5,353,388 | 10/1994 | Motoyama | 395/117 |
| 5,469,533 | 11/1995 | Dennis | 395/114 |
| 5,475,801 | 12/1995 | Brindle et al. | 395/114 |
| 5,502,804 | 3/1996 | Butterfield et al. | 395/147 |
| 5,509,115 | 4/1996 | Butterfield et al. | 395/147 |
| 5,555,435 | 9/1996 | Campbell et al. | 395/800 |
| 5,572,631 | 11/1996 | Kavathekar et al. | 395/101 |
| 5,600,768 | 2/1997 | Andresen | 345/435 |
| 5,604,843 | 2/1997 | Shaw et al. | 395/101 |
| 5,671,341 | 9/1997 | Kashiwazaki et al. | 395/112 |
| 5,706,410 | 1/1998 | Bagley et al. | 395/112 |
| 5,715,379 | 2/1998 | Pavlovic et al. | 395/112 |
| 5,748,861 | 5/1998 | Kashiwazaki et al. | 395/110 |
| 5,796,411 | 7/1995 | Cyman et al. | 345/502 |
| 5,828,817 | 6/1995 | Landau | 395/112 |

OTHER PUBLICATIONS

Microsoft Press Computer Dictionary, p. 175, 1997.

*Primary Examiner*—Amelia Au
*Assistant Examiner*—Martin Miller

[57] ABSTRACT

An imaging subsystem for a printer is configured to support multiple printer personalities. The imaging subsystem has an integrated display list that is accessed and used by all of the printer personalities. The printer implements a display list builder tool that assists each personality in posting its objects to the display list.

11 Claims, 6 Drawing Sheets

INTEGRATED DISPLAY LIST AND BUILDING TOOL FOR MULTIPLE PERSONALITIES

TECHNICAL FIELD

This invention relates to systems and methods for displaying or printing objects using a display list format. More particularly, this invention relates the systems and methods implemented in printers, and particularly laser printers, which print objects according to a display list format in banded areas of the printing space.

BACKGROUND OF THE INVENTION

When printing a document, a host computer first translates the document from a language that the host application understands to one that the printer understands. By proper use of the printer language, the host computer instructs the printer what to print. In a modern printing environment, there are multiple printer languages, also referred to as printer personalities, available to a user.

A printer personality, which is typically implemented as a software/firmware module, embodies the necessary instructions to properly accept incoming data in a particular printer language and convert that representation to a simple data stream used by the print engine to print a page. The printer personality is responsible for such tasks as accepting and storing downloaded fonts, selecting and deselecting printer settings, giving feedback to the host on the status of a printer job, and so forth.

Typically, a printer is implemented with the printer personality of the manufacturer. For example, Hewlett-Packard Company uses a printer personality based on its PCL™ printer language. More specifically, PCL is a page description language: the data stream describes what the page should look like and prints the page when it is complete.

Some printers support multiple printer personalities, allowing the user to use the same printer with a variety of applications and hardware. Examples of other printer languages include ESC/P™ from Seiko Epson Kabushiki Kausha, and PostScript™ from Adobe Systems, Inc.

Each personality uses resources of the printer to execute its job. Such resources include RAM (Random Access Memory), ROM (Read Only Memory), hard disk, I/O channels, control panel, paper trays, and print engine. The personalities may share printer resources or partition the resources in such a way that there is minimal interaction between personalities.

Conventional printers, and particularly laser printers manufactured by Hewlett-Packard Company and others, employ an object-oriented approach to building a page. This approach involves handling items that are to be printed on the page as a set of objects. The page description for PCL-based printers consists of objects combined with colors and patterns. An obvious benefit of an object-oriented page description language is that the objects do not have to be created in a position dependent order. The kinds of objects used in PCL are text, rules (rectangles), graphics (vectors and polygons), images, and patterns.

A parser uses the objects to construct a list, known as a "display list." The display list tracks a temporal order of the objects according to a first in, first out (FIFO) protocol. The display list is sent to an image processor, which may apply colors and patterns to the listed objects.

While the printed results appear as a unified image, the printer actually segments the page into horizontal bands or "strips". FIG. 1 shows a page 20 with four strips 22a–22d. Each strip has an associated display list, so that there are many display lists per page. Each display list identifies the objects that affect the associated strip. The display list entries contain information concerning how to print the objects within the strips.

Prior to the present invention, each printer personality loaded on a printer essentially required its own display list processing pipeline. Each personality was required to construct and maintain its own display list. While this separate pipeline approach has a benefit in avoiding incompatibility problems caused by switching among multiple personalities, it has several drawbacks including additional memory capacity and additional debug support to identify various bugs introduced by different display list technologies.

SUMMARY OF THE INVENTION

According to one aspect of this invention, a printer has an imaging subsystem that supports multiple printer personalities. The imaging subsystem has an integrated display list pipeline that can be accessed and used by all of the printer personalities.

According to another aspect of this invention, the printer implements a display list builder tool that assists each personality in posting its objects to a display list.

When a personality is executed in the printer, the personality initially registers its object table with the imaging subsystem. In return, the imaging subsystem assigns a unique range of opcodes numbers to be used by the personality and provides access to the display list builder tool. In the described implementation, the imaging subsystem returns pointers to three routines that enable the personality to put information pertaining to its objects into the display list. Using the three routines, the personality constructs the display list that can be handled by the integrated display list pipeline.

DETAILED DESCRIPTION OF THE PREFERRED EMBODIMENT

Figure 1:
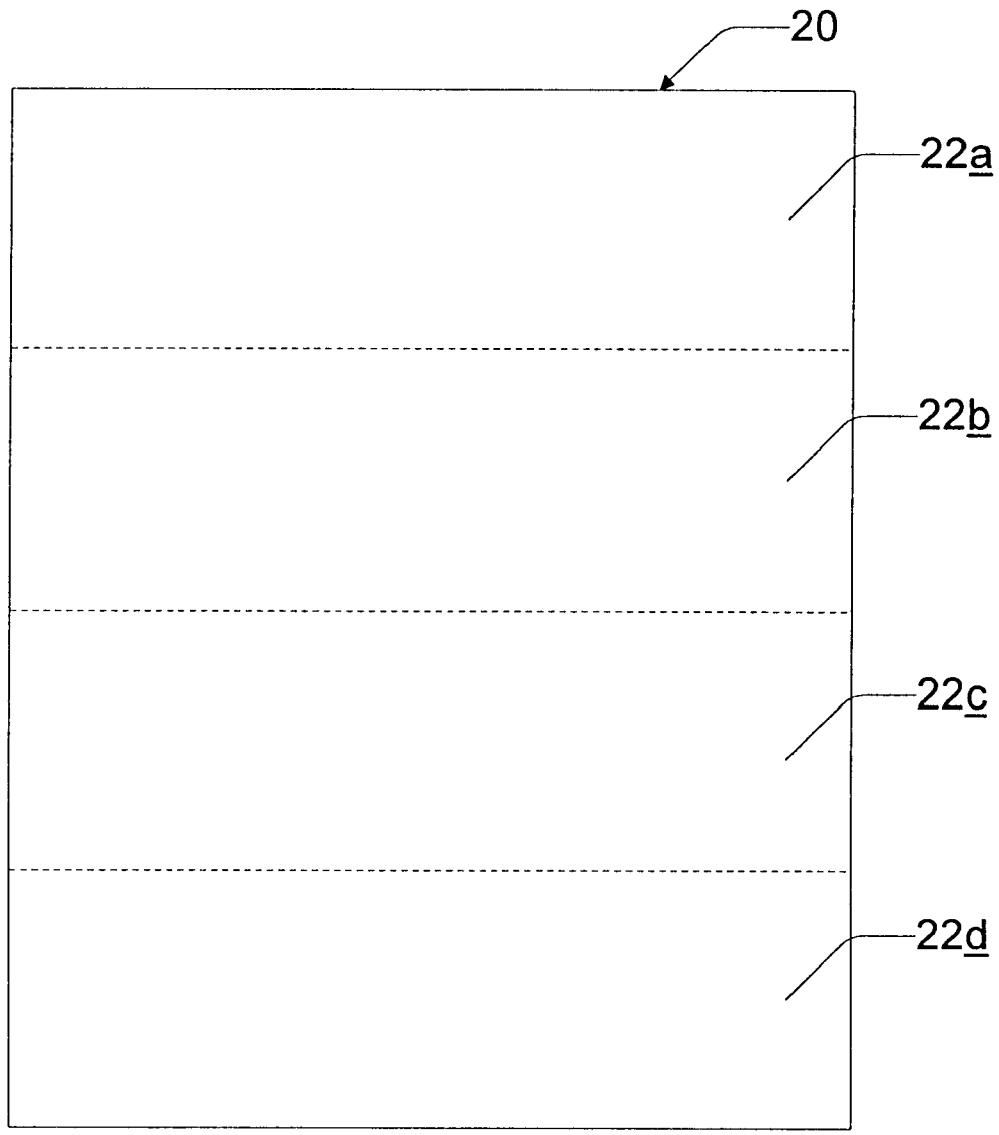
FIG. 1 is a diagrammatic illustration of a prior art convention of segmenting a page into multiple strips for purposes of printing data.
Figure 2:
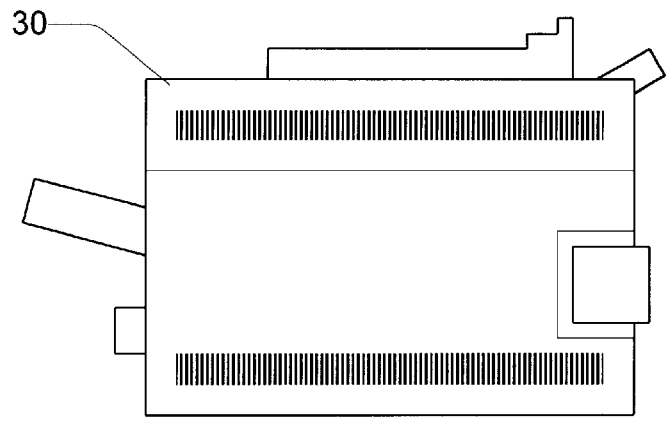
FIG. 2 is a side view of a printer.

FIG. 2 shows a laser printer 30, which implements aspects of this invention. It is noted that this invention may also be implemented in other types of printers, such as inkjet printers. Although this invention is described in the context of printers, it may be incorporated into other products that utilize printing devices, such as scanners and photocopiers, and also into display devices. The invention is particularly well suited for devices that display or print objects using a display list format in areas that are banded or segmented into strips.

This invention concerns an imaging subsystem having an integrated display list that can be used by multiple printer personalities. A personality is a program that accepts print language commands and translates them into printer dependent descriptions for output pages. In general, the personality receives input data from the printer data channel, interrogates the system state, obtains the installed print resources (such as fonts), and outputs printer dependent page descriptions. The personality has no specific knowledge of how the I/O, printer engine, control panel, or any other printer hardware works. Using a well-defined interface and a layered design, the hosting firmware knows nothing about the personality command language, and the personality has limited knowledge of the detailed operations of the printing platform.

Figure 3:
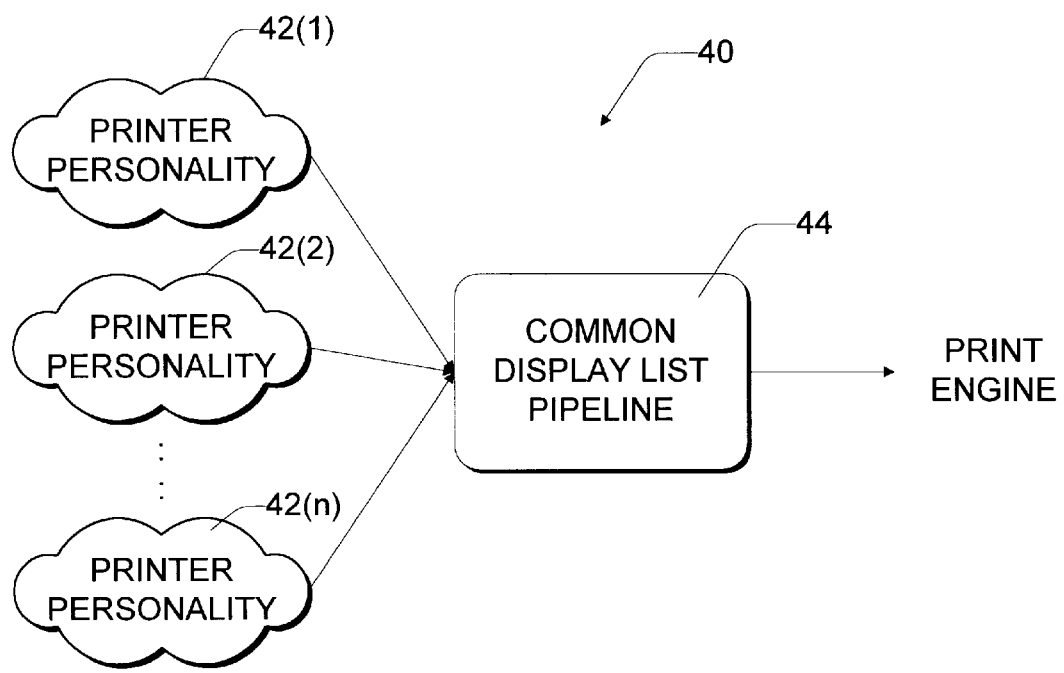
FIG. 3 is a functional illustration of an imaging subsystem.

FIG. 3 shows a portion of the imaging subsystem 40 having multiple printer personalities 42(1), 42(2), . . . , 42(n). The personalities can be built into the original printer firmware during manufacturing or added to the printer system after the printer is sold. The imaging subsystem 40 also has a common display list pipeline 44, which can be used by all of the personalities. All printer personalities 42(1)–42(n) register with the imaging subsystem during initialization. In return, the imaging subsystem 40 grants access to the integrated display list pipeline 44.

During printing, a particular personality is selected or de-selected to interpret an input data stream. Each print job is vectored to one of the installed personalities. The selected personality processes the input data stream according to its objects in the display list to create low-level printer data used by the print engine to place dots on the page. The selected personality remains selected until an end-of-job boundary is detected, whereupon the personality relinquishes control back to the system code.

Figure 4:
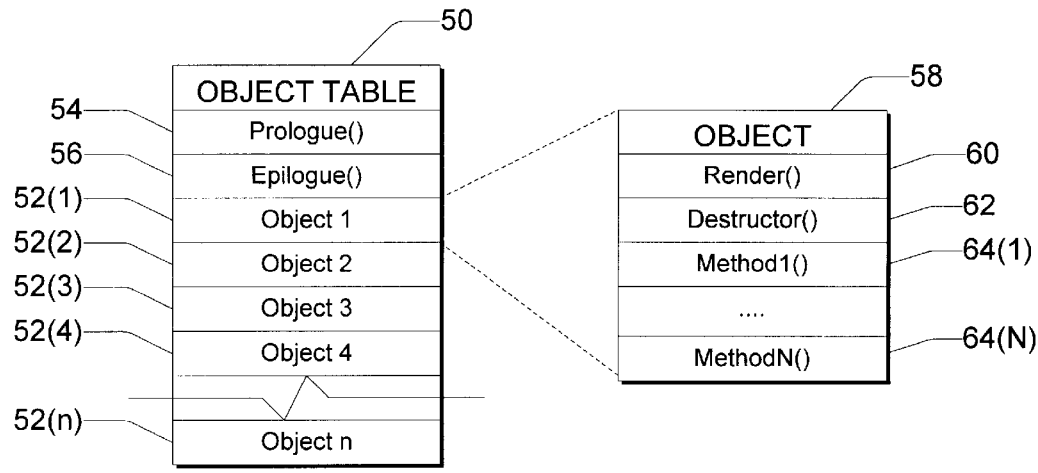
FIG. 4 is a diagrammatic illustration of an object table defined by a printer personality.

Each personality defines a set of objects used to construct a page. FIG. 4 shows an object table 50 for a printer personality. The object table 50 contains a list of "n" objects 52(1), . . . , 52(n), with each object containing instructions on how to draw a particular item or shape on a page. Common object types include text, rules (i.e., rectangles), vectors, polygons, and raster.

The object table 50 also contains two routines—prologue 54 and epilogue 56—used to setup and tear down the new rendering code. The objects described by these routines do not need to place marks on the page, but could simply be state control objects. The object table 50 is arranged with function pointers to the prologue and epilogue routines, followed by the list of object entries.

Each object in the table 50 has a structure 58. This structure contains all the methods that are supported for each object. If the method returns the number of words of memory used by the display list entry, it can be passed to the system parser. The parser is setup to a certain "mode" so it will call the proper method as it traverses the display list. If the method does not return the amount of memory used, it may still be included within the structure, but it will not be made available to the parser. Some typical methods are given below:

Render(void *state, void *inter)

The render routine 60 has two parameters in the form of pointers, a "state" pointer and an "inter" pointer. The state pointer is to a drawing tool, and the inter parameter points to information that describes the object to be rendered (e.g., the display list entry pointer). A drawing tool is a repository of all the necessary information to allow the object's methods to query and understand the current environment in which they are operating. It contains information regarding the active memory and current settings that determine how the object is to be processed. The render routine understands the format of the strip memory, its header, and state. The routine returns the number of words of memory consumed by reading the object so that pointer(s) to the display list can be updated to find the next valid object.

The object structure 58 has a destructor routine 62 that is used to reclaim any resources other than the data already in the display list that are reserved for the object. The destructor routine 62 has two parameters, an "inter" pointer and a "when" value:

Destructor(void *inter, when)

The "inter" pointer is to information that describes the object, such as the display list entry pointer, and the "when" value dictates the time at which the resources are released to the system. The routine also returns the number of words of memory consumed by reading the object so that pointer(s) to the display list can be updated to find the next valid object.

The data structure 58 also shows other possible methods 64(1), . . . , 64(N) that might be used to support the object.

Figure 5:
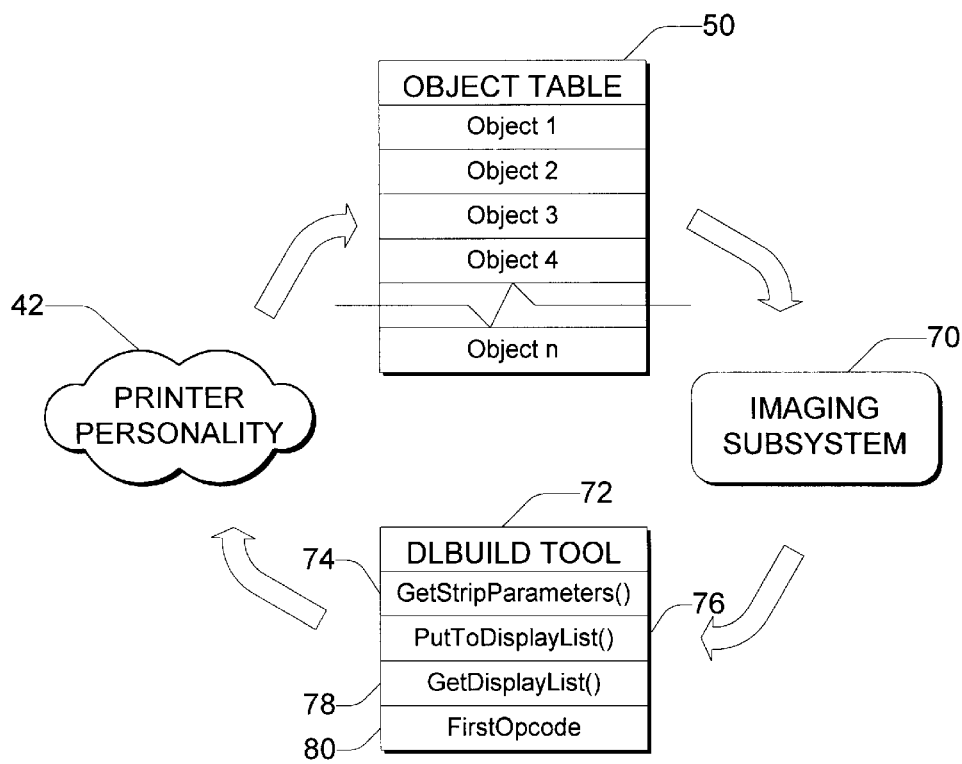
FIG. 5 is a functional diagram illustrating the process of registering a personality and receiving, in return, access to a display list builder tool.

FIG. 5 shows a process in which the personality registers its object table 50 with the imaging subsystem during initialization. The personality, referenced generally as number 42, calls a register routine to register table 50 with the imaging subsystem 70. The register routine assigns a unique range of opcode numbers to be used by the personality 42.

The imaging subsystem 70 provides access to a display list builder tool 72, which assists the personality 42 in constructing display list entries for the common display list pipeline. More particularly, the imaging subsystem 70 returns pointers to three routines that enable the personality to put information pertaining to its objects into the display list, and a first opcode to use for the first object.

The personality 42 uses the display list builder tool 72 to build entries for the display list. Generally, the building process involves retrieving the strip information for a page, and for each strip touched by the object, putting content into display list entries to print the objects at the appropriate locations on the page.

To construct a display list entry for a given object, the personality first calls the GetStripParameters routine 74. This function allows the personality to query the imaging subsystem 70 for all vital parameters that describe the physical dimensions of the destination strip used by the print engine. The routine is called as follows:

GetStripParameters(yTop, yBot)

The personality passes in two parameters describing the vertical extent of the object to be placed on a page (i.e., yTop, yBot). The routine 74 returns information to allow the personality to break up the object and place the proper pieces in the correct display list for each strip. The return values include strip height, strip width, and how many strips the object touches as represented by the top and bottom strips that are touched by the object. The top y value of the top strip might also be returned. If the object is completely occluded, all return values are zero.

Next, beginning with the strip that contains yTop and continuing for every strip until the strip that contains yBot, the personality calls the GetDisplayList routine 76 to reserve display list memory for the affected strip and the PutToDisplayList routine 78 to build the memory image of the information to describe the object. This GetDisplayList routine 76 is called as follows:

GetDisplayList(opcode, size, stripindex)

The routine specifies the requested size (in bytes) to reserve for the strip that is identified by the strip index number. If there is not sufficient space to hold the object, more memory is allocated. The routine also updates any state information for proper rendering.

Next, the personality calls the PutToDisplayList routine 78, as follows:

PutToDisplayList(*dle, opcode, size, stripindex)

This routine is responsible for ensuring that a memory of "size" bytes, which is used to hold data contents referenced by pointer "dle" (i.e., display list entry), is successfully placed into the display list for the strip identified as "stripindex". Prior to placing the object into the list, a call is made to update the state of the display list for the strip in question to the current state of the page. After successfully placing the object into the display list, a call is made to the complexity check routine registered for the object. The complexity check routine uses the opcode to index into the object table to call the method found there.

The FirstOpcode value 80 is the value returned by the imaging subsystem 70 to the personality 42. The FirstOpcode value 80 is the starting opcode in the range of opcodes returned by the register routine. The personality 42 bases all of its opcodes for future parsing on this FirstOpcode value.

Using the display list builder tool 72, the personality 42 builds entries for the display list. Each entry can contain many words. The first word in each entry, however, is a predefined 32-bit word.

Figure 6:
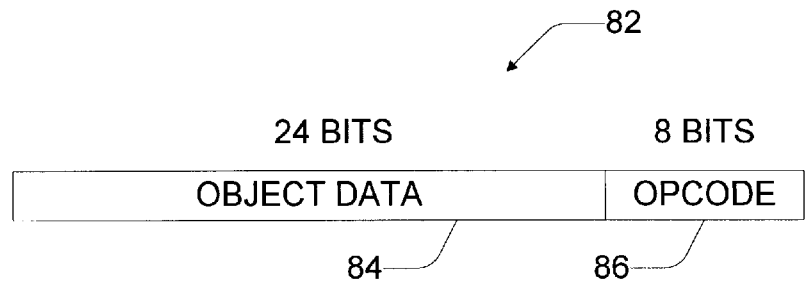
FIG. 6 is a diagrammatic illustration of a data structure for the first word in each display list table entry.

FIG. 6 shows the first word 82 of all display list entries. It contains a 24-bit segment 84 that is available for object data, and an 8-bit segment 86 to contain an opcode value.

Figure 7:
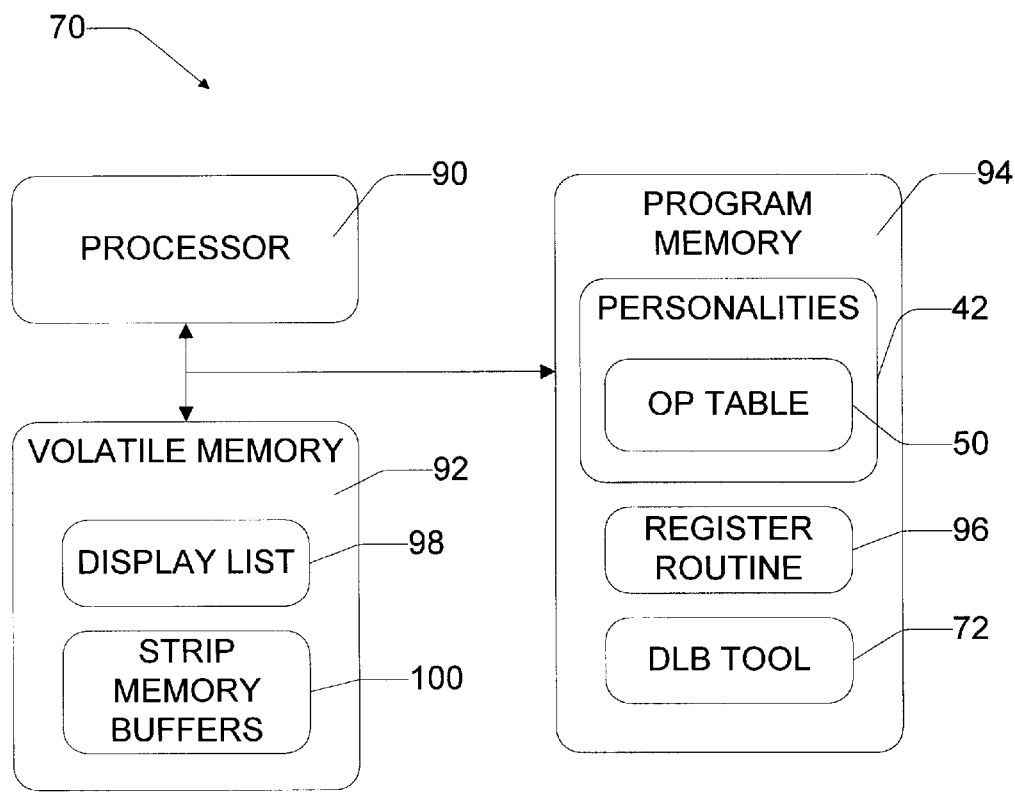
FIG. 7 is a block diagram of an imaging subsystem implemented in a data processing unit.

FIG. 7 shows the imaging subsystem 70 implemented as a processing unit in the printer 20. In this implementation, the imaging subsystem 70 has a processor 90, a volatile memory 92 (i.e., RAM), and a non-volatile program memory 94 (e.g., ROM, Flash).

Multiple personalities 42 are stored in program memory 94. These personalities can be loaded during manufacturing or afterward. A register routine 96 and the display list builder (DLB) tool 72 are also stored in the program memory 94. During execution, a selected personality 42 is loaded into volatile memory 92 for execution on processor 90. The executing personality 42 invokes the registered routine 96 and the DLB tool 72 to construct display lists 98 for corresponding strips. The display lists 98 reside in volatile memory 92.

The imaging subsystem 70 processes an incoming data stream using the display lists 98 and places the resultant pixel data into strip memory buffers 100. The implementation described with respect to FIG. 7 is provided to explain one possible implementation of the imaging subsystem. It is noted that the imaging subsystem can be implemented in other ways, such as through dedicated hardware/firmware components using ASIC (application specific integrated circuit) chips or the like.

Figure 8:
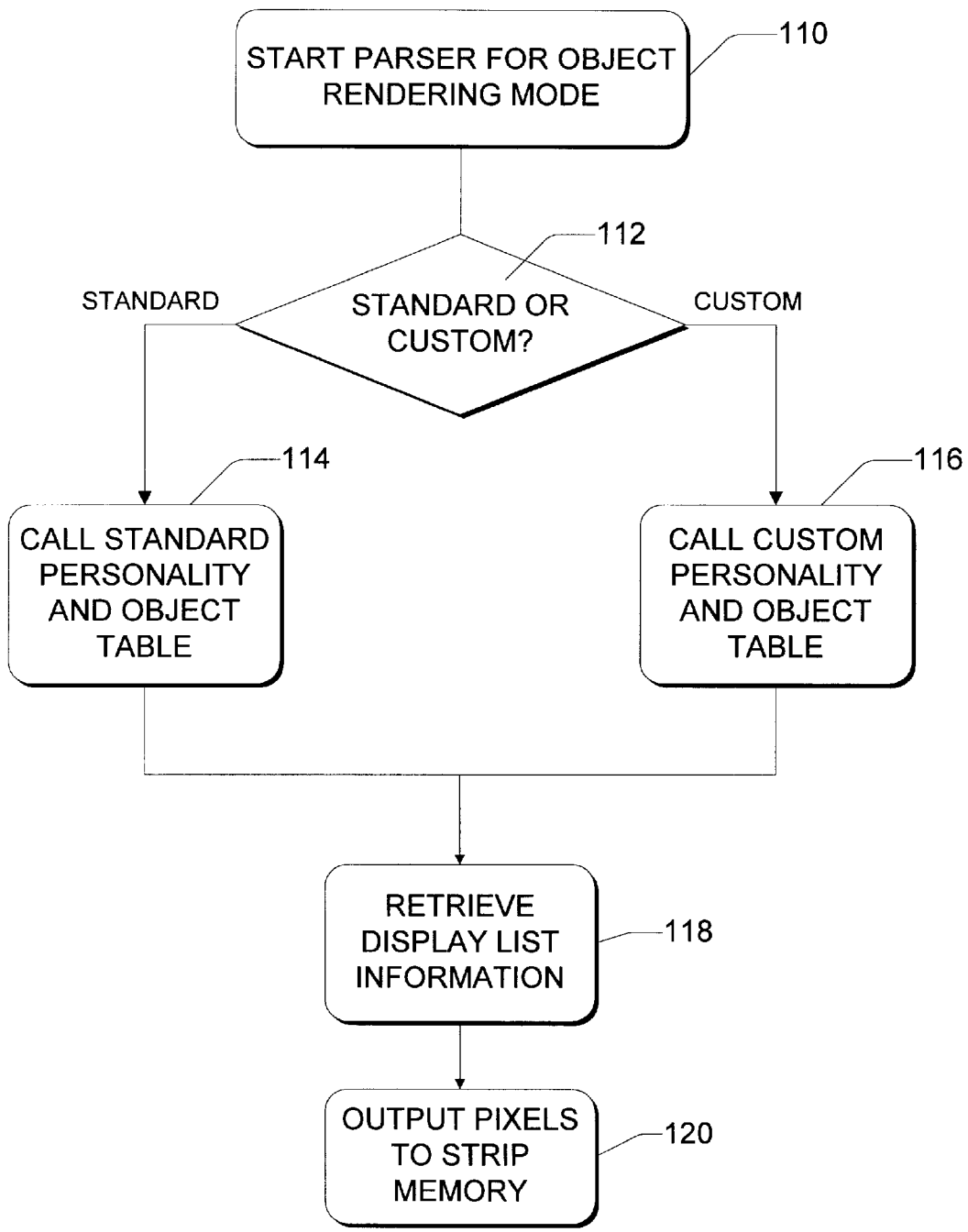
FIG. 8 is a flow diagram showing steps in a method for processing data for printing.

FIG. 8 shows a rendering process to process a display list entry created from an incoming stream of data from the host. At step 110 in FIG. 8, the imaging subsystem invokes a parsing routine to parse the data stream. The parser has an understanding of the different object modes provided by the object structure 58 (i.e., render, destructor, etc.). The parser performs the steps of FIG. 8 for each of the different modes.

At step 112 in FIG. 8, the parser determines whether a standard personality or a custom personality is selected. If a standard personality is selected, the parser invokes the standard personality and its object table (step 114). The standard personality calls to a set of standard render, destructor, etc. On the other hand, if the custom personality is selected, the parser invokes the custom personality and its object table to call a special set of render, destructor, etc. (step 116 in FIG. 8).

The routines of the selected personality access the display list information contained in the integrated display list that was created earlier using the display list builder tool (step 118 in FIG. 8). The routines utilize the display list information to create the pixel data that is passed to and stored in the strip memory buffers (step 120 in FIG. 8). The data is subsequently read out of the buffers to the print engine for depositing dots onto a print medium.

Figure 9:
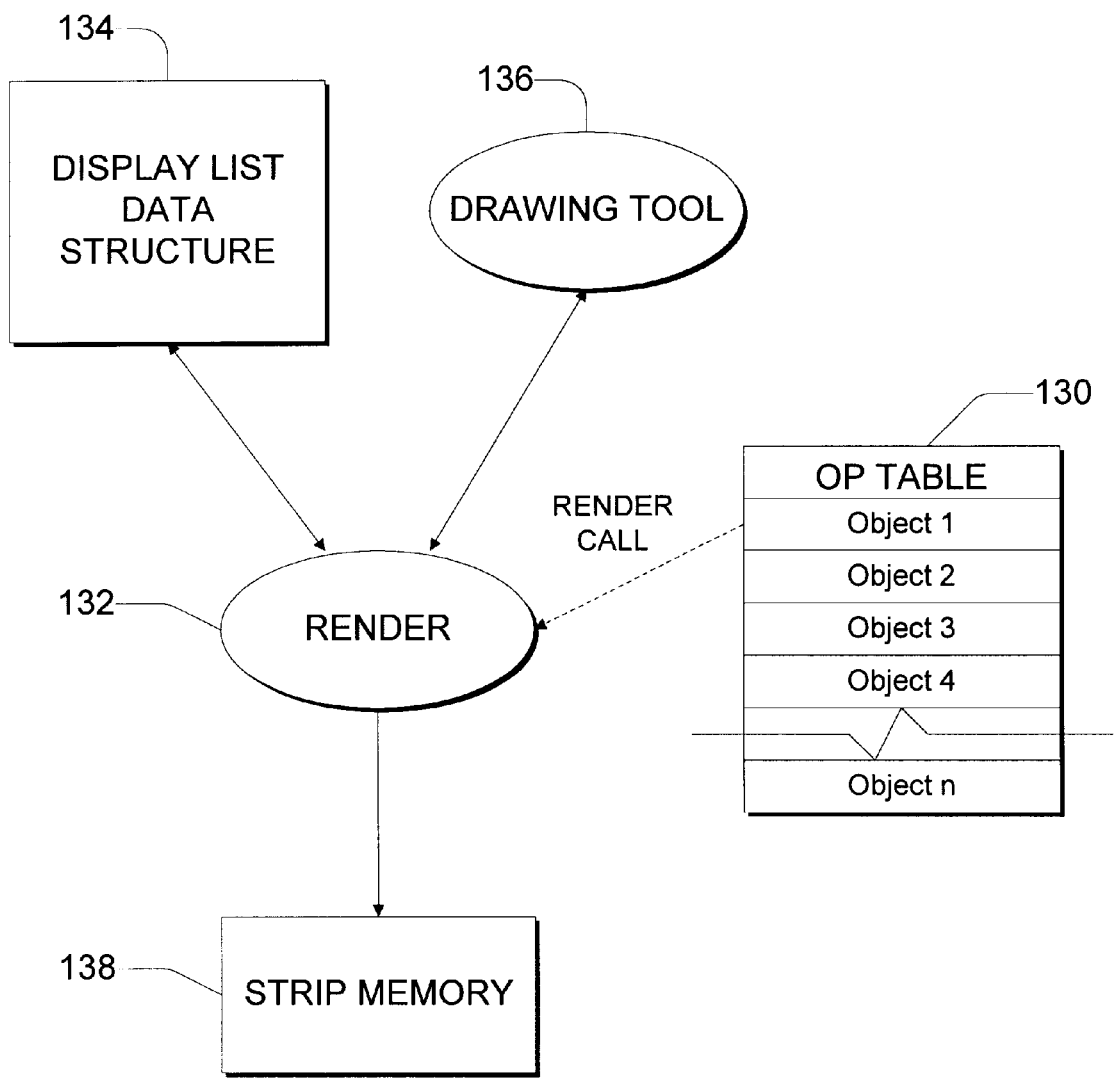
FIG. 9 is a functional diagram illustrating interaction of functional components during the method steps of FIG. 8.

FIG. 9 shows the interaction of the functional components during the rendering mode of the FIG. 8 process. The object table 130 of the selected personality calls to the render routine 132 identified in the data structure of each object table entry. The renderer 132 accesses the integrated display list data store 134 to retrieve display list information, and invokes a drawing tool 136 to construct pixel data. The renderer 132 outputs the pixel data to the strip memory 138 for output to the print engine.

The invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An imaging subsystem comprising:
   multiple personalities, each of the multiple personalities being configured to convert incoming data in a particular language to a low-level data stream utilized to form a visual representation;
   a common display list pipeline logically connected to each of the multiple personalities, each of the multiple personalities utilizing the common display list pipeline to create display lists that can be used to produce the low-level data stream;
   a processor;
   memory; and
   a display list builder tool accessible to each of the multiple personalities to assist the personalities in constructing the display lists, the display list builder tool comprising means for obtaining information for a page, and means for putting content into the display lists in accordance with objects defined by the printer personalities;
   wherein the means for obtaining information for a page comprises processor-executable instructions that pass two printer personality parameters that describe a vertical extent of an object to be presented into a routine that returns information to allow the personality to segment the object and place the proper segments in the correct display list; and
   wherein the means for putting content into the display lists comprises processor-executable instructions that reserve space for the display lists in memory and build a memory image of the object to be presented by storing the incoming data in the display lists.

2. An imaging subsystem as recited in claim 1, wherein:

the visual representation is segmented into horizontal strips;

one display list is created for each strip; and wherein the means for obtaining information for a page comprises means for obtaining strip information for a page.

3. An imaging subsystem as recited in claim 1, wherein each display list contains one or more entries, with each entry having a first word with a predefined bit structure that includes a segment for an opcode value, the opcode value segment identifying a first opcode associated with the display list entry.

4. A printer comprising an imaging subsystem as recited in claim 1.

5. An imaging processing unit for a printer that executes multiple software printer personalities, comprising:

a common display list pipeline;

a display list builder tool called by each of the printer personalities to assist the printer personalities in constructing display lists to be handled in the common integrated display list pipeline, the display list builder tool comprising means for obtaining strip information for a page, and means for putting content into the display lists in accordance with objects defined by the printer personalities;

wherein the means for obtaining strip information for a page comprises processor-executable instructions that pass two printer personality parameters that describe a vertical extent of an object to be presented into a routine that returns information to allow the personality to segment the object and place the proper segments in the correct display list for each strip; and wherein the means for putting content into the display lists comprises processor-executable instructions that reserve space for the display lists in memory and build a memory image of the object to be presented by storing the incoming data in the display lists.

6. A printer incorporating an imaging processing unit as recited in claim 5.

7. In a printer having an imaging subsystem which supports multiple software printer personalities, a method comprising the following steps:

registering a first printer personality with the imaging subsystem;

receiving access to a display list builder tool which utilizes a common display list pipeline for the multiple software printer personalities;

using the display list builder tool to build one or more display lists for the first printer personality according to the following steps:

(a) obtaining parameters of one or more strips in a page by passing two printer personality parameters that describe a vertical extent of an object to be presented into a routine that returns information to allow the personality to segment the object and place the proper segments in the correct display list for each strip; and (b) for each strip, reserving space in a display list memory and building a memory image of sufficient size to fit within the reserved space in the display list memory, the memory image describing an object to be presented within said each strip;

registering a second printer personality with the imaging subsystem;

receiving access to the a display list builder tool;

using the display list builder tool to build one or more display lists for the second printer personality according to the following steps:

(a) obtaining parameters of one or more strips in a page by passing two printer personality parameters that describe a vertical extent of an object to be presented into a routine that returns information to allow the personality to segment the object and place the proper segments in the correct display list for each strip; and (b) for each strip, reserving space in a display list memory and building a memory image of sufficient size to fit within the reserved space in the display list memory, the memory image describing an object to be presented within said each strip.

8. A method as recited in claim 7, further comprising the step of assigning, for each of the first and second registered printer personalities, a unique range of opcodes associated with the first and second registered printer personalities, respectively.

9. A display list that is created and stored in the display list memory as a result of the steps in the method as recited in claim 7.

10. A program embodied on a computer-readable medium for constructing a display list on behalf of multiple personalities, comprising:

a first code segment to obtain parameters of one or more strips in an area within which an object is to be presented;

a second code segment to receive two printer personality parameters that describe a vertical extent of an object to be presented and return information that allows the personality to segment the object and place the proper segments in the correct display list for each strip;

a third code segment to reserve display list memory for each of the strips;

a fourth code segment to build a memory image in the display list memory, the memory image having information to describe the object to be presented within the strips; and the first, second, third and fourth code segments being implemented as callable pieces of code in a display list pipeline that is utilized by the multiple personalities.

11. A printer comprising the program as recited in claim 10.

* * * * *